(12) United States Patent
Hong

(10) Patent No.: US 9,503,149 B1
(45) Date of Patent: Nov. 22, 2016

(54) ELECTRONIC DEVICE AND CONTROL METHOD THEREOF

(71) Applicants: Beijing Lenovo Software Ltd., Haidian District, Beijing (CN); Lenovo (Beijing) Co., Ltd., Haidian District, Beijing (CN)

(72) Inventor: Xiaofeng Hong, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/929,548

(22) Filed: Nov. 2, 2015

(30) Foreign Application Priority Data

Jul. 28, 2015 (CN) .......................... 2015 1 0450971

(51) Int. Cl.
*H04B 1/48* (2006.01)
*H04B 1/40* (2015.01)
*H04B 7/04* (2006.01)
*H04W 84/12* (2009.01)

(52) U.S. Cl.
CPC ........ *H04B 1/40* (2013.01); *H04B 7/04* (2013.01); *H04W 84/12* (2013.01)

(58) Field of Classification Search
CPC .......... H04B 1/40; H04B 7/04; H04W 84/12
USPC ............................................. 455/78; 370/278
See application file for complete search history.

(56) References Cited

U.S. PATENT DOCUMENTS

| | | | | |
|---|---|---|---|---|
| 4,225,883 A * | 9/1980 | Van Atta | ................... | H04N 5/33 250/334 |
| 4,713,521 A * | 12/1987 | Eldridge | ................. | B23K 9/10 219/130.5 |
| 5,233,351 A * | 8/1993 | Gregory | .................. | G01S 7/285 331/76 |
| 5,822,312 A * | 10/1998 | Peach | ................... | H04B 7/2041 370/323 |
| 6,537,216 B1 * | 3/2003 | Shifrin | .................. | B06B 1/0215 600/437 |
| 6,808,494 B2 * | 10/2004 | Shifrin | .................. | G01S 7/5202 600/437 |
| 7,075,906 B2 * | 7/2006 | Douglas | ................ | H04W 24/02 370/328 |
| 7,221,921 B2 * | 5/2007 | Maligeorgos | ....... | H04L 27/0002 331/36 R |
| 7,242,912 B2 * | 7/2007 | Maligeorgos | ........... | H03L 7/085 455/260 |
| 7,468,638 B1 * | 12/2008 | Tsai | ........................ | H04B 1/48 331/126 |
| 7,738,840 B2 * | 6/2010 | Rofougaran | ............. | H04B 1/48 455/78 |
| 7,899,411 B2 * | 3/2011 | Rofougaran | ............. | H04B 1/48 455/78 |
| 8,010,057 B2 * | 8/2011 | Rofougaran | ............. | H04B 1/48 455/78 |
| 8,023,452 B2 * | 9/2011 | Douglas | ................ | H04W 24/02 370/328 |
| 8,149,091 B2 * | 4/2012 | Nagai | ................ | G06K 7/10356 340/10.1 |
| 8,600,459 B2 * | 12/2013 | Rofougaran | .......... | H04W 48/08 455/41.2 |

(Continued)

*Primary Examiner* — Hai V Nguyen
(74) *Attorney, Agent, or Firm* — Brinks Gilson & Lione; G. Peter Nichols

(57) ABSTRACT

An electronic device includes a transceiver including a transmitting interface and a receiving interface; a wireless network processor for transmitting or receiving wireless local area network signal; an antenna for transmitting or receiving the radio-frequency signal and transmitting or receiving the wireless local area network signal; an amplifier for amplifying the signal from the transmitting interface of the transceiver, the radio-frequency signal received from the antenna by the transceiver and the wireless local area network signal transmitted or received through the transmission interface by the wireless network processor; and a controller for controlling the amplifier to amplify the radio-frequency signal, or amplify the wireless local area network signal according to detection signals from the transceiver and the wireless network processor. The electronic device can reduce manufacturing costs and improve the connection performance of the wireless local area network.

12 Claims, 3 Drawing Sheets

(56) References Cited

U.S. PATENT DOCUMENTS

| | | | | |
|---|---|---|---|---|
| 8,767,859 B2 * | 7/2014 | Fukamachi | H01P 1/20336 | 375/267 |
| 8,918,062 B2 * | 12/2014 | Komninakis | H04B 7/0691 | 343/711 |
| 8,995,591 B2 * | 3/2015 | Gudem | H04L 5/0098 | 375/219 |
| 9,026,070 B2 * | 5/2015 | Persico | H04B 1/109 | 375/247 |
| 9,118,439 B2 * | 8/2015 | Fernando | H04L 5/001 | |
| 9,154,356 B2 * | 10/2015 | Tasic | H03G 3/20 | |
| 9,154,357 B2 * | 10/2015 | Tasic | H03G 3/20 | |
| 9,160,598 B2 * | 10/2015 | Davierwalla | H03G 3/20 | |
| 9,166,852 B2 * | 10/2015 | Davierwalla | H03G 3/20 | |
| 9,215,671 B2 * | 12/2015 | Zhao | H04W 52/288 | |
| 9,236,929 B2 * | 1/2016 | Komninakis | H04B 7/0691 | |
| 2004/0158147 A1 * | 8/2004 | Shifrin | G01S 7/5202 | 600/437 |
| 2005/0088998 A1 * | 4/2005 | Douglas | H04W 24/02 | 370/338 |
| 2006/0104253 A1 * | 5/2006 | Douglas | H04W 24/02 | 370/338 |
| 2007/0101122 A1 * | 5/2007 | Guo | H04L 63/061 | 713/153 |
| 2007/0120650 A1 * | 5/2007 | Nagai | G06K 7/10356 | 340/10.2 |
| 2008/0194212 A1 * | 8/2008 | Rofougaran | H04B 1/48 | 455/78 |
| 2009/0137206 A1 * | 5/2009 | Sherman | H04W 16/14 | 455/41.2 |
| 2010/0008338 A1 * | 1/2010 | Tsfati | H04B 1/006 | 370/338 |
| 2010/0203847 A1 * | 8/2010 | Gorbachov | H04B 1/18 | 455/84 |
| 2010/0210224 A1 * | 8/2010 | Rofougaran | H04B 1/48 | 455/78 |
| 2011/0110452 A1 * | 5/2011 | Fukamachi | H01P 1/20336 | 375/267 |
| 2011/0111707 A1 * | 5/2011 | Rofougaran | H04B 1/48 | 455/78 |
| 2011/0136446 A1 * | 6/2011 | Komninakis | H04B 7/0691 | 455/78 |
| 2011/0194543 A1 * | 8/2011 | Zhao | H04W 52/288 | 370/338 |
| 2011/0299436 A1 * | 12/2011 | Mikhemar | H04B 1/18 | 370/278 |
| 2014/0003000 A1 * | 1/2014 | McPartlin | H01L 29/732 | 361/728 |
| 2014/0087671 A1 * | 3/2014 | Mostov | H03F 1/0227 | 455/78 |
| 2014/0087672 A1 * | 3/2014 | Mostov | H03F 1/0227 | 455/78 |
| 2014/0087673 A1 * | 3/2014 | Mostov | H03F 1/0227 | 455/78 |
| 2014/0302803 A1 * | 10/2014 | Komninakis | H04B 7/0691 | 455/78 |
| 2015/0118977 A1 * | 4/2015 | Emmanuel | H04B 1/48 | 455/83 |
| 2016/0028391 A1 * | 1/2016 | Li | H03K 17/687 | 327/374 |
| 2016/0191085 A1 * | 6/2016 | Kasnavi | H04B 1/0458 | 455/78 |

* cited by examiner

~ 300

| Controlling the amplifier to amplify the signal from the transmitting interface of the transceiver and the radio-frequency signal received from the antenna by the transceiver when the wireless local area network signal detected by the wireless network processor is larger than the first threshold or when it is detected that the transmitting interface and the receiving interface of the transceiver are in the working status | S310 |

↓

| Controlling the amplifier to amplify the wireless local area network signal transmitted or received through the transmission interface by the wireless network processor when the wireless local area network signal detected by the wireless network processor is less than the second threshold and the transmitting interface and the receiving interface of the transceiver are not in the working status | S320 |

FIG. 3

ELECTRONIC DEVICE AND CONTROL METHOD THEREOF

This application claims priority to Chinese patent application No. 201510450971.0 filed Jul. 28, 2015, the entire contents of which are incorporated herein by reference.

BACKGROUND

This disclosure relates to an electronic device, and more particularly to an electronic device having a circuit structure in which a transceiver and a wireless network processor can multiplex an amplifier.

Transmitting and receiving performance of a current WiFi (Wireless Fidelity) wireless networking chipset is not high. For example, for a currently mainstream chip WCN3680B of a QC (Qualcomm) platform, when it operates at a frequency band of 2.4G, the transmitting power thereof is relatively small, and the maximum transmitting power is only 15.2 dBm. And, when it operates at this frequency band, the receiving sensitivity thereof is only −73.5 dBm, which results in a small coverage range of wireless signal transmitted, and the opportunity of connecting a wireless access node is correspondingly reduced. A low receiving sensitivity may result in a weak WiFi wireless networking signal after being connected to the wireless access node, and thus the wireless network connection tends to be disconnected, which affects a usage experience of a user.

At present, there is a solution which improves the transmitting power of WiFi by adding an outlaid FEM (Front End Module), and the Qualcomm platform supports this solution. Although a MTK (MediaTek) platform supports it theoretically, this support is not validated practically. Further, adding the Front End Module would increase the manufacturing cost of the product, and increase the area of an arranging lines of a printed circuit board, and the improvement of the performance of WiFi is limited, which can be only improved by 2-3 dB.

SUMMARY

In order to solve the above-described conventional technical problems, according to one aspect of the disclosure, there provides an electronic device including: a transceiver including a transmitting interface and a receiving interface and for transmitting radio-frequency signal through the transmitting interface and receiving the radio-frequency signal through the receiving interface; a wireless network processor including a transmission interface and for transmitting or receiving wireless local area network signal through the transmission interface; an antenna for transmitting or receiving the radio-frequency signal and transmitting or receiving the wireless local area network signal; an amplifier for amplifying the signal from the transmitting interface of the transceiver, the radio-frequency signal received from the antenna by the transceiver and the wireless local area network signal transmitted or received through the transmission interface by the wireless network processor; and a controller for controlling the amplifier to amplify the radio-frequency signal transmitted by the transceiver and the radio-frequency signal received from the antenna by the transceiver, or amplify the wireless local area network signal transmitted or received through the transmission interface by the wireless network processor according to detection signals from the transceiver and the wireless network processor.

BRIEF DESCRIPTION OF THE DRAWINGS

In order to describe the technical solution of the embodiment of the disclosure more clearly, the accompanying drawings necessary for the description of the embodiments are explained simply. The accompanying drawings in the following description are only exemplary embodiment of the disclosure.

FIG. 3 illustrates a flow chart of a communication control method 300 applied to the electronic device 100 according to one example of the disclosure.

DETAILED DESCRIPTION

Hereinafter, the preferred embodiments of the disclosure are described detailed with reference to the accompanying drawings. It should be noticed that in the specification and accompanying drawings, substantially the same steps and elements are represented by the same reference numbers, and the repetitive explanation on these steps and elements would be omitted.

"One embodiment" or "an embodiment" mentioned throughout this specification means that specific features, structures or characteristics described in combination with the embodiments are included in at least one described embodiment. Therefore, the term "in one embodiment" or "in an embodiment" appeared in the specification does not necessarily refer to the same embodiment. Further, the specific features, structures or characteristics may be combined with one or more embodiments in any ways.

Figure 1:
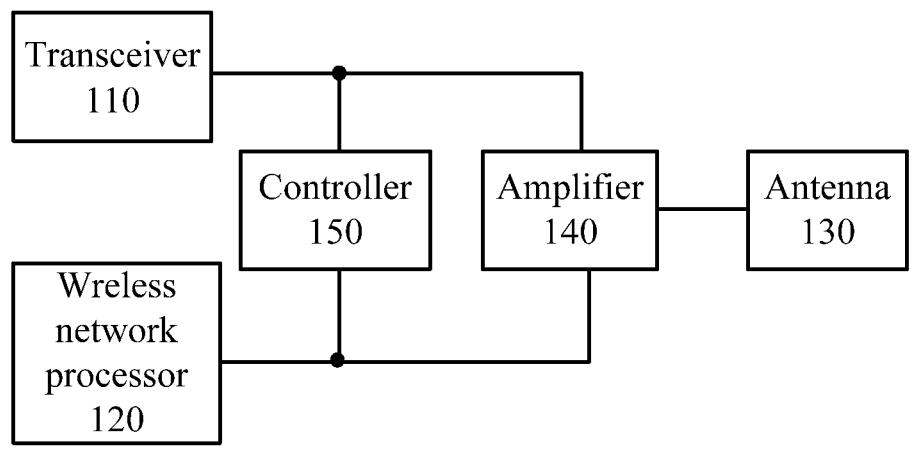
FIG. 1 illustrates a schematic structured block diagram of a structure of a communication circuit applied to an electronic device 100 according to the embodiment of the disclosure.

FIG. 1 illustrates a schematic structured block diagram of the structure of a communication circuit applied to an electronic device 100 according to an embodiment of the disclosure. Generally, as shown in FIG. 1, the electronic device 100 includes a transceiver 110, a wireless network processor 120, an antenna 130, an amplifier 140 and a controller 150.

Specifically, the transceiver 110 of the electronic device 100 includes a transmitting interface and a receiving interface, and the transceiver 110 is for transmitting radio-frequency signal through the transmitting interface and receiving the radio-frequency signal through the receiving interface. The wireless network processor 120 includes a transmission interface and the wireless network processor 120 is for transmitting or receiving wireless local area network signal through the transmission interface.

The antenna 130 is for transmitting or receiving the radio-frequency signal and transmitting or receiving the wireless local area network signal. In particular, in one embodiment of the disclosure, the antenna 130 further includes: a first antenna for transmitting the radio-frequency signal; a second antenna for receiving the radio-frequency signal; and a third antenna for transmitting or receiving the wireless local area network signal.

The amplifier 140 is for amplifying the signal from the transmitting interface of the transceiver 110, the radio-frequency signal received from the antenna 130 by the transceiver 110 and the wireless local area network signal transmitted or received through the transmission interface by the wireless network processor 120. In particular, for example, in one example of the disclosure, the amplifier 140 further includes: a first amplifier for amplifying the signal from the transmitting interface of the transceiver 110 or for amplifying the wireless local area network signal transmitted through the transmission interface by the wireless network processor 120; and a second amplifier for amplifying the radio-frequency signal received from the antenna 130 or for amplifying the wireless local area network signal received through the transmission interface by the wireless network processor 120.

The controller 150 is for controlling the amplifier to amplify the signal transmitted by the transceiver 110 and the radio-frequency signal received from the antenna 130 by the transceiver 110, or amplify the wireless local area network signal transmitted or received through the transmission interface by the wireless network processor 120 according to detection signals from the transceiver 110 and the wireless network processor 120. In particular, for example, in one example of the disclosure, the controller 150 is further for controlling the amplifier 140 to amplify the signal from the transmitting interface of the transceiver 110 and the radio-frequency signal received from the antenna 130 by the transceiver 110 when wireless local area network signal detected by the wireless network processor 120 is larger than a first threshold or when the wireless network processor 120 detects that the transmitting interface and the receiving interface of the transceiver 110 are in the working status; and controlling the amplifier to amplify the wireless local area network signal transmitted or received through the transmission interface by the wireless network processor 120 when the wireless local area network signal detected by the wireless network processor 120 is less than a second threshold and the transmitting interface and the receiving interface of the transceiver 110 are not in the working status.

In one embodiment of the disclosure, the electronic device further includes: a first switch for connecting the first amplifier to the transmitting interface of the transceiver 110 and a third switch respectively, and the first switch being further for turning on/off a connection path between the transmitting interface and the first amplifier or turning on/off a connection path between the third switch and the first amplifier according to the control of the controller 150; a second switch for connecting the second amplifier to the receiving interface of the transceiver 110 and the third switch respectively, and the second switch being for turning on/off a connection path between the receiving interface and the second amplifier or turning on/off a connection path between the third switch and the second amplifier according to the control of the controller 150; and the third switch for connecting the wireless network processor 120 to the first switch, the second switch and the third antenna respectively, the third switch being for turning on/off a connection path between the wireless network processor 120 and the first switch or turning on/off a connection path between the wireless network processor 120 and the second switch or turning on/off a connection path between the wireless network processor 120 and the third antenna according to the control of the controller 150.

Here, the controller 150 is further for controlling the third switch to turn on the connection path between the wireless network processor 120 and the third antenna and turn off the connection path between the wireless network processor 120 and the first switch and the connection path between the wireless network processor 120 and the second switch when the wireless local area network signal detected by the wireless network processor 120 is larger than the first threshold or when it is detected that the transmitting interface and the receiving interface of the transceiver 110 are in the working status. The controller 150 is further for controlling the third switch to turn on the connection path between the wireless network processor 120 and the first switch and turn on the connection path between the wireless network processor 120 and the second switch and turn off the connection path between the wireless network processor 120 and the third antenna, and controlling the first switch to turn off the connection path between the transmitting interface and the first amplifier and turn on the connection path between the third switch and the first amplifier, and controlling the second switch to turn off the connection path between the receiving interface and the second amplifier and turn on the connection path between the third switch and the second amplifier when the wireless local area network signal detected by the wireless network processor 120 is less than the second threshold and the transmitting interface and the receiving interface of the transceiver 110 are not in the working status.

Figure 2:
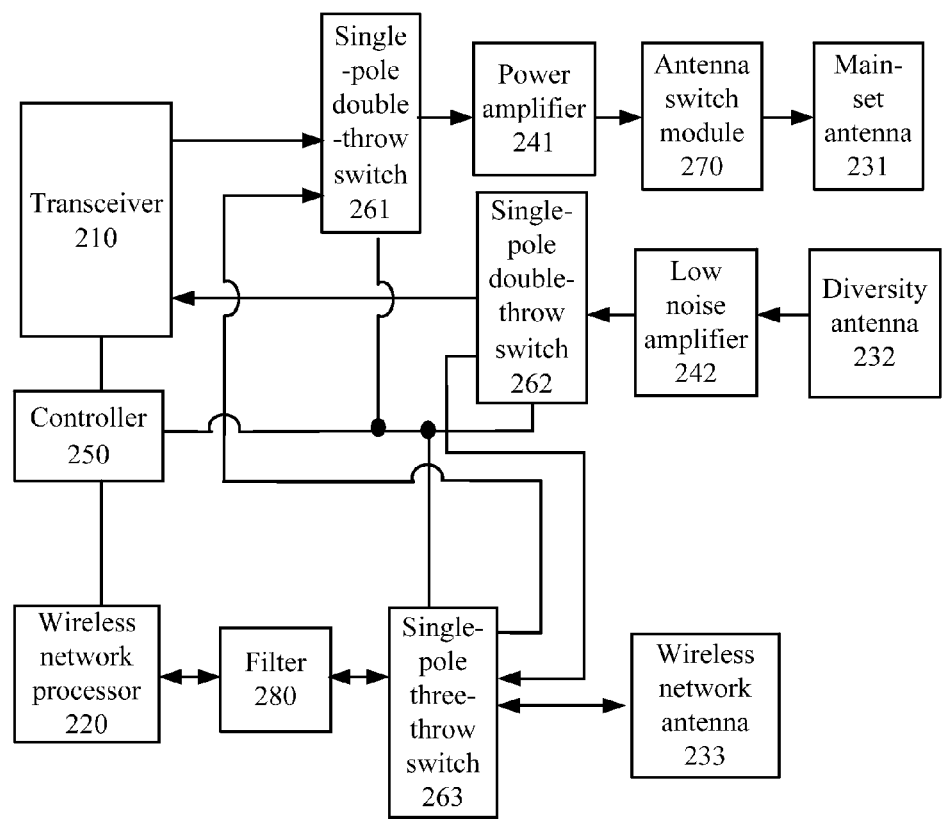
FIG. 2 illustrates a schematic structured block diagram of a communication circuit applied to an electronic device 200 according to one example of the disclosure.

In order to explain usage situations of the electronic device having the communication circuit provided by the disclosure in the above embodiments in more detail, examples are taken with reference to FIG. 2 as follows. FIG. 2 illustrates a schematic structured block diagram of a communication circuit applied to an electronic device 200 according to one example of the disclosure. Here, in this example, as show in the figure, the electronic device 200 includes: a transceiver 210, a wireless network processor 220, a main-set antenna 231, a diversity antenna 232, a wireless network antenna 233, a power amplifier 241, a low noise amplifier 242, a controller 250, a single-pole double-throw switch 261, a single-pole double-throw switch 262, a single-pole three-throw switch 263, an antenna switch module 270 and a filter 280.

Here, the transceiver 210 includes a transmitting interface and a receiving interface, the transceiver 210 transmits radio-frequency signal through the transmitting interface and receives the radio-frequency signal through the receiving interface. The single-pole double-throw switch 261 connects the power amplifier 241 to the transmitting interface of the transceiver 210 and the single-pole three-throw switch 263 respectively, and the single-pole double-throw switch 261 further turns on/off a connection path between the transmitting interface of the transceiver 210 and the power amplifier 241 or turn on/off a connection path between the single-pole three-throw switch 263 and the power amplifier 241 according to the control of the controller 250. The power amplifier 241 is connected to the transmitting interface of the transceiver 210 through the single-pole double-throw switch 261, and the power amplifier 241 is for amplifying the signal from the transmitting interface of the transceiver 210. The antenna switch module 270 is connected between the power amplifier 241 and the main-set antenna 231, and the antenna switch module 270 is for switching on and off of the working status of the main-set antenna 231.

The single-pole double-throw switch 262 is for connecting the low noise amplifier 242 to the receiving interface of the transceiver 210 and the single-pole three-throw switch 263 respectively, and the single-pole double-throw switch 262 is for turning on/off a connection path between the receiving interface of the transceiver 210 and the low noise amplifier 242 or turning on/off a connection path between the single-pole three-throw switch 263 and the low noise amplifier 242 according to the control of the controller 250. The low noise amplifier 242 is connected between the single-pole double-throw switch 262 and the diversity antenna 232, and the low noise amplifier 242 is for amplifying the radio-frequency signal received from the diversity antenna 232. The diversity antenna 232 is connected to the low noise amplifier 242, and the diversity antenna 232 is for receiving the radio-frequency signal.

The wireless network processor 220 includes a transmission interface, and the wireless network processor 220 is for transmitting or receiving wireless local area network signal through the transmission interface. The filter 280 is connected between the wireless network processor 220 and the single-pole three-throw switch 263, and the filter 280 is for filtering the signal from the wireless network processor 220 or the signal received from the wireless network antenna 233 through the single-pole three-throw switch 263. The single-pole three-throw switch 263 is for connecting the filter 280 to the single-pole double-throw switch 261, the single-pole double throw switch 262 and the wireless network antenna 233 respectively, and the single-pole three-throw switch 263 is for turning on/off a connection path between the filter 280 and the single-pole double-throw switch 261 or turning on/off a connection path between the filter 280 and the single-pole double-throw switch 262 or turning on/off a connection path between the filter 280 and the wireless network antenna 233 according to the control of the controller 250. Wireless network antenna 233 is connected to the single-pole three-throw switch 263 and for transmitting or receiving the wireless local area network signal. The controller 250 is connected to the transceiver 210, the wireless network processor 220, the single-pole double-throw switch 261, the single-pole double-throw switch 262 and the single-pole three-throw switch 263, and for controlling the single-pole double-throw switch 261, the single-pole double-throw switch 262 and the single-pole three-throw switch 263 to be turned on and off of according to detection signals from the transceiver 210 and the wireless network processor 220.

Hereinafter, specific implementation modes of the electronic device 200 having the communication circuit are described with reference to FIG. 2. As shown in FIG. 2, when the wireless local area network signal detected by the wireless network processor 220 is relatively strong, the controller 250 controls the single-pole three-throw switch 263 to turn on the connection path between the filter 280 and the wireless network antenna 233 and turn off the connection path between the filter 280 and the single-pole double-throw switch 261 and the connection path between the filter 280 and the single-pole double-throw switch 262. When the wireless local area network signal detected by the wireless network processor 220 is relatively weak and the transmitting interface and the receiving interface of the transceiver 210 are not in the working status, the controller 250 controls the single-pole three-throw switch 263 to turn on the connection path between the filter 280 and the first single-pole double-throw switch 261, and turn on the connection path between the filter 280 and the second single-pole double-throw switch 262, and turn off the connection path between the filter 280 and the wireless network antenna 233, the controller 250 also controls the single-pole double-throw switch 261 to turn off the connection path between the transmitting interface of the transceiver 210 and the amplifier 241, and turn on the connection path between the single-pole three-throw switch 263 and the amplifier 241, and the controller 250 also controls the single-pole double-throw switch 262 to turn off the connection path between the receiving interface of the transceiver 210 and the low noise amplifier 242, and turn on the connection path between the single-pole three-throw switch 263 and the low noise amplifier 242. It can be seen that, in this example, a transmitting path of the wireless network connection WiFi multiplexes the power amplifier 241 of a main-set antenna of the transceiver 210 through one single-pole three-throw switch 263 and one single-pole double-throw switch 261. Minimum power output of the power amplifier 241 of the transceiver 210 can reach 27 dBm. A receiving path of the wireless network connection WiFi multiplexes the low noise amplifier 242 of a diversity antenna of the transceiver 210 through one single-pole three-throw switch 263 and one single-pole double-throw switch 262, and the power gain of the low noise amplifier 242 of the transceiver 210 can reach 12.5 dB. The total cost of the added single-pole double-throw switch 261, single-pole double-throw switch 262 and single-pole three-throw switch 263 is less than the cost of a component of the front end module FEM adopted conventionally. And after adopting the solution of this example, the performance of the wireless network connection WiFi is improved by at least 6 dB in a free space. The distance covered by the WiFi signal is enlarged by one time, which improves the user experience.

Thus, it can be seen, by adopting the structure of the communication circuit provided by the disclosure, the circuit structure in the conventional smart electronic device is optimized, so as to save the manufacturing cost and improve the performance of WiFi as well, and the transmitting and receiving performance of WiFi is improved by multiplexing a PA (power amplifier) of the main-set antenna and a LNA (low noise amplifier) of the diversity antenna of the radio frequency transceiver modules of the packet switching domain service of LTE/TDS or the like, so that the antenna logic control device in the smart electronic device becomes more efficient and practical, which improves the usage experience of the user.

Further, according to another aspect of the disclosure, a control method 300 of the electronic device 100 is provided. FIG. 3 illustrates a flow chart of the control method 300 applied to the electronic device 100 according to one example of the disclosure. Here, as shown in FIG. 1, the electronic device 100 includes the transceiver 110, the wireless network processor 120, the antenna 130, the amplifier 140 and the controller 150. In particular, the transceiver 110 of the electronic device 100 includes the transmitting interface and the receiving interface, and the transceiver 110 is for transmitting the radio-frequency signal through the transmitting interface and receiving the radio-frequency signal through the receiving interface. The wireless network processor 120 includes the transmission interface and the wireless network processor 120 is for transmitting or receiving the wireless local area network signal through the transmission interface. The antenna 130 is for transmitting or receiving the radio-frequency signal, and transmitting or receiving the wireless local area network signal. The amplifier 140 is for amplifying the signal from the transmitting interface of the transceiver 110, the radio-frequency signal received from the antenna 130 by the transceiver 110 and the wireless local area network signal transmitted or received through the transmission interface by the wireless network processor 120. The control method 300 includes: controlling the amplifier 140 to amplify the radio-frequency signal transmitted by the transceiver 110 and the radio-frequency signal received from the antenna 130 by the transceiver 110, or amplify the wireless local area network signal transmitted or received through the transmission interface by the wireless network processor 120 according to detection signals from the transceiver 110 and the wireless network processor 120.

In particular, as shown in FIG. 3, the control method 300 of the electronic device 100 further includes: step S310, controlling the amplifier 140 to amplify the signal from the transmitting interface of the transceiver 110 and the radio-frequency signal received from the antenna 130 by the transceiver 110 when the wireless local area network signal detected by the wireless network processor 120 is larger than a first threshold or when it is detected that the transmitting interface and the receiving interface of the transceiver 110 are in the working status; Step S320, controlling the amplifier 140 to amplify the wireless local area network signal transmitted or received through the transmission interface by the wireless network processor 120 when the wireless local area network signal detected by the wireless network processor 120 is less than a second threshold and the transmitting interface and the receiving interface of the transceiver 110 are not in the working status.

Specifically, the amplifier 140 of the electronic device 100 further includes: a first amplifier for amplifying the signal from the transmitting interface of the transceiver or for amplifying the wireless local area network signal transmitted through the transmission interface by the wireless network processor 120; and a second amplifier for amplifying the radio-frequency signal received from the antenna or for amplifying the wireless local area network signal received through the transmission interface by the wireless network processor 120. And, the antenna 130 further includes: a first antenna for transmitting the radio-frequency signal; a second antenna for receiving the radio-frequency signal; and a third antenna for transmitting or receiving the wireless local area network signal. The electronic device further includes: a first switch for connecting the first amplifier to the transmitting interface of the transceiver and a third switch respectively, and the first switch being further for turning on/off a connection path between the transmitting interface and the first amplifier or turning on/off a connection path between the third switch and the first amplifier according to the control of the controller; a second switch for connecting the second amplifier to the receiving interface of the transceiver and the third switch respectively, and the second switch being for turning on/off a connection path between the receiving interface and the second amplifier or turning on/off a connection path between the third switch and the second amplifier according to the control of the controller; and the third switch for connecting the wireless network processor to the first switch, the second switch and the third antenna respectively, the third switch being for turning on/off a connection path between the wireless network processor and the first switch or turning on/off a connection path between the wireless network processor and the second switch or turning on/off a connection path between the wireless network processor and the third antenna according to the control of the controller.

At this time, the control method 300 further includes: controlling the third switch to turn on the connection path between the wireless network processor 120 and the third antenna and turn off the connection path between the wireless network processor 120 and the first switch and the connection path between the wireless network processor 120 and the second switch when the wireless local area network signal detected by the wireless network processor 120 is larger than the first threshold or when it is detected that the transmitting interface and the receiving interface of the transceiver 110 are in the working status. The control method further includes: controlling the third switch to turn on the connection path between the wireless network processor 120 and the first switch and turn on the connection path between the wireless network processor 120 and the second switch and turn off the connection path between the wireless network processor 120 and the third antenna, and controlling the first switch to turn off the connection path between the transmitting interface and the first amplifier and turn on the connection path between the third switch and the first amplifier, and controlling the second switch to turn off the connection path between the receiving interface and the second amplifier and turn on the connection path between the third switch and the second amplifier when the wireless local area network signal detected by the wireless network processor 120 is less than the second threshold and the transmitting interface and the receiving interface of the transceiver 110 are not in the working status.

Thus, it can be seen that, by adopting the control method of the communication circuit provided by the disclosure, the transmitting and receiving performance of the connection of the wireless local area network can be improved by multiplexing the power amplifier and the low noise amplifier of the main-set/diversity antenna of the radio frequency transceiver modules of the packet switching domain service of the transceiver, so as to make the antenna logic control device in the smart electronic device more efficient and practical, which improves the usage experience of the user.

Those skilled in the art can understand that the disclosure can be made various modifications, combinations, partial combinations and alternation depending on the design needs and other factors, so long as they are in the scope of the attached claims and their equivalents.

The invention claimed is:

1. An electronic device comprising:
a transceiver including a transmitting interface and a receiving interface and configured to transmit a radio-frequency signal through the transmitting interface and to receive the radio-frequency signal through the receiving interface;
a wireless network processor including a transmission interface and configured to transmit or receive a wireless local area network signal through the transmission interface;
an antenna configured to transmit or receive the radio-frequency signal and transmit or receive the wireless local area network signal;
an amplifier configured to amplify the signal from the transmitting interface of the transceiver, the radio-frequency signal received from the antenna by the transceiver, and the wireless local area network signal transmitted or received through the transmission interface by the wireless network processor; and
a controller configured to control the amplifier to amplify the radio-frequency signal transmitted by the transceiver and the radio-frequency signal received from the antenna by the transceiver, or to amplify the wireless local area network signal transmitted or received through the transmission interface by the wireless network processor according to detection signals from the transceiver and the wireless network processor.

2. The electronic device according to claim 1, wherein the controller is further configured to control the amplifier to amplify the signal from the transmitting interface of the transceiver and the radio-frequency signal received from the antenna by the transceiver when the wireless local area network signal detected by the wireless network processor is larger than a first threshold or when it is detected that the transmitting interface and the receiving interface of the transceiver are in the working status; and to control the amplifier to amplify the wireless local area network signal transmitted or received through the transmission interface by the wireless network processor when the wireless local area network signal detected by the wireless network processor is less than a second threshold and it is detected that the transmitting interface and the receiving interface of the transceiver are not in the working status.

3. The electronic device according to claim 2, wherein the amplifier further comprises:
   a first amplifier configured to amplify the signal from the transmitting interface of the transceiver or to amplify the wireless local area network signal transmitted through the transmission interface by the wireless network processor; and
   a second amplifier configured to amplify the radio-frequency signal received from the antenna or to amplify the wireless local area network signal received through the transmission interface by the wireless network processor;
   and, the antenna further comprises:
   a first antenna configured to transmit the radio-frequency signal;
   a second antenna configured to receive the radio-frequency signal; and
   a third antenna configured to transmit or receive the wireless local area network signal.

4. The electronic device according to claim 3, further comprising:
   a first switch configured to connect the first amplifier to the transmitting interface of the transceiver and a third switch respectively, with the first switch being further configured to turn on/off a connection path between the transmitting interface and the first amplifier or turn on/off a connection path between the third switch and the first amplifier according to the control of the controller;
   a second switch configured to connect the second amplifier to the receiving interface of the transceiver and the third switch respectively, with the second switch being configured to turn on/off a connection path between the receiving interface and the second amplifier or turn on/off a connection path between the third switch and the second amplifier according to the control of the controller; and
   the third switch configured to connect the wireless network processor to the first switch, the second switch, and the third antenna respectively, the third switch being configured to turn on/off a connection path between the wireless network processor and the first switch or turn on/off a connection path between the wireless network processor and the second switch or turn on/off a connection path between the wireless network processor and the third antenna according to the control of the controller.

5. The electronic device according to claim 4, wherein the controller is further configured to control the third switch to turn on the connection path between the wireless network processor and the third antenna, and turn off the connection path between the wireless network processor and the first switch and the connection path between the wireless network processor and the second switch, when the wireless local area network signal detected by the wireless network processor is larger than the first threshold or when it is detected that the transmitting interface and the receiving interface of the transceiver are in the working status.

6. The electronic device according to claim 5, wherein the controller is further configured to control the third switch to turn on the connection path between the wireless network processor and the first switch and turn on the connection path between the wireless network processor and the second switch and turn off the connection path between the wireless network processor and the third antenna, and control the first switch to turn off the connection path between the transmitting interface and the first amplifier and turn on the connection path between the third switch and the first amplifier, and control the second switch to turn off the connection path between the receiving interface and the second amplifier and turn on the connection path between the third switch and the second amplifier when the wireless local area network signal detected by the wireless network processor is less than the second threshold and the transmitting interface and the receiving interface of the transceiver are not in the working status.

7. A control method for an electronic device that comprises a transceiver including a transmitting interface and a receiving interface and configured to transmit a radio-frequency signal through the transmitting interface and to receive radio-frequency signal through the receiving interface; a wireless network processor including a transmission interface and configured to transmit or receive wireless local area network signal through the transmission interface; an antenna configured to transmit or receive the radio-frequency signal and transmit or receive the wireless local area network signal; an amplifier configured to amplify the signal from the transmitting interface of the transceiver, the radio-frequency signal received from the antenna by the transceiver and the wireless local area network signal transmitted or received through the transmission interface by the wireless network processor; the control method comprising:
   controlling the amplifier to amplify the radio-frequency signal transmitted by the transceiver and the radio-frequency signal received from the antenna by the transceiver, or to amplify the wireless local area network signal transmitted or received through the transmission interface by the wireless network processor according to detection signals from the transceiver and the wireless network processor.

8. The control method according to claim 7, further comprising:
   controlling the amplifier to amplify the signal from the transmitting interface of the transceiver and the radio-frequency signal received from the antenna by the transceiver when the wireless local area network signal detected by the wireless network processor is larger than a first threshold or when it is detected that the transmitting interface and the receiving interface of the transceiver are in the working status; and
   controlling the amplifier to amplify the wireless local area network signal transmitted or received through the transmission interface by the wireless network processor when the wireless local area network signal detected by the wireless network processor is less than a second threshold and the transmitting interface and the receiving interface of the transceiver are not in the working status.

9. The control method according to claim 8, wherein the amplifier further comprises:
   a first amplifier configured to amplify the signal from the transmitting interface of the transceiver or to amplify the wireless local area network signal transmitted through the transmission interface by the wireless network processor; and
   a second amplifier configured to amplify the radio-frequency signal received from the antenna or to amplify the wireless local area network signal received through the transmission interface by the wireless network processor;

and, the antenna further comprises:
a first antenna configured to transmit the radio-frequency signal;
a second antenna configured to receive the radio-frequency signal; and
a third antenna configured to transmit or receive the wireless local area network signal.

10. The control method according to claim 9, wherein the electronic device further comprises:
a first switch configured to connect the first amplifier to the transmitting interface of the transceiver and a third switch respectively, with the first switch being further configured to turn on/off a connection path between the transmitting interface and the first amplifier or turn on/off a connection path between the third switch and the first amplifier according to the control of the controller;
a second switch configured to connect the second amplifier to the receiving interface of the transceiver and the third switch respectively, with the second switch being configured to turn on/off a connection path between the receiving interface and the second amplifier or turn on/off a connection path between the third switch and the second amplifier according to the control of the controller; and
the third switch configured to connect the wireless network processor to the first switch, the second switch and the third antenna respectively, with the third switch being configured to turn on/off a connection path between the wireless network processor and the first switch or turn on/off a connection path between the wireless network processor and the second switch or turn on/off a connection path between the wireless network processor and the third antenna according to the control of the controller.

11. The control method according to claim 10, further comprising controlling the third switch to turn on the connection path between the wireless network processor and the third antenna, and to turn off the connection path between the wireless network processor and the first switch and the connection path between the wireless network processor and the second switch, when the wireless local area network signal detected by the wireless network processor is larger than the first threshold or when it is detected that the transmitting interface and the receiving interface of the transceiver are in the working status.

12. The control method according to claim 11, further comprising controlling the third switch to turn on the connection path between the wireless network processor and the first switch and to turn on the connection path between the wireless network processor and the second switch and turn off the connection path between the wireless network processor and the third antenna, and controlling the first switch to turn off the connection path between the transmitting interface and the first amplifier and to turn on the connection path between the third switch and the first amplifier, and controlling the second switch to turn off the connection path between the receiving interface and the second amplifier and turn on the connection path between the third switch and the second amplifier when the wireless local area network signal detected by the wireless network processor is less than the second threshold and the transmitting interface and the receiving interface of the transceiver are not in the working status.

* * * * *